Jan. 14, 1964   J. A. SKUPAS ETAL   3,117,655
MAGNETIC LOCK FOR A CASTER ASSEMBLY
Filed Feb. 13, 1961   2 Sheets-Sheet 1
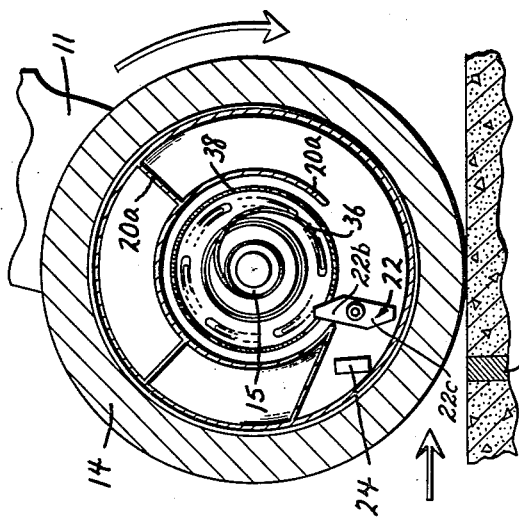
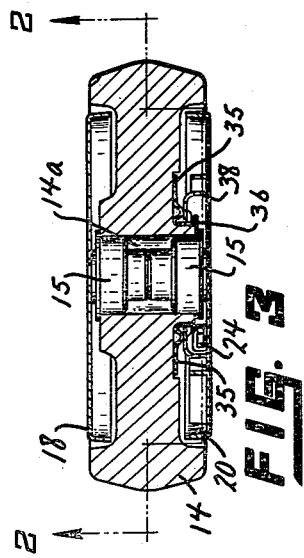
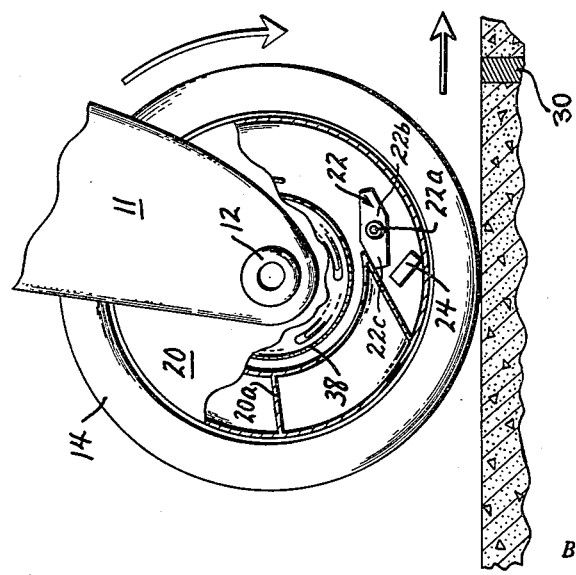
INVENTORS
JOHN A. SKUPAS
ROBERT H. GODWIN
IRVING STOLLMAN
BY
Lockwood Woodard Smith & Weikart
Attorneys INVENTORS
JOHN A. SKUPAS
ROBERT H. GODWIN
IRVING STOLLMAN
BY
Lockwood Woodard Smith & Weikart
Attorneys United States Patent Office 3,117,655
Patented Jan. 14, 1964

3,117,655
MAGNETIC LOCK FOR A CASTER ASSEMBLY
John A. Skupas and Robert H. Godwin, Evansville, Ind., and Irving Stollman, 1400 Thompson Ave., Evansville, Ind.; said Skupas and Godwin assignors of two-thirds to Faultless Caster Corporation, Evansville, Ind., a corporation of Indiana
Filed Feb. 13, 1961, Ser. No. 88,850
8 Claims. (Cl. 188—111)

The present invention relates to a caster assembly, and more particularly to a new and improved caster assembly which may be effectively locked against rotation when moved into a magnetic field.

As is known, supermarket operators and like merchants have been increasingly plagued with the theft of the movable carts commonly found in such establishments, with the ultimate result being an economic burden, as well as an annoyance, to successful store operation. Although other anti-theft devices have been proposed, such as that described in the Hyman Chait United States Patent No. 3,031,038, granted April 24, 1962, entitled Magnetic Wheel Lock, and in the Irving Stollman United States Patent No. 3,031,037, granted April 24, 1962, entitled Caster Structure, the applicants herein have invented a new and novel caster assembly which provides features not present in the aforementioned devices.

Broadly, by virtue of the instant invention, the caster assembly is locked against rotation, when in a magnetic field, through the frictional force or thrust of a movable cam against a portion of the supporting framework for the unit. More specifically, the wedging of such cam is in response to its riding on another cam which is fixedly disposed on the wheel forming part of the assembly, where a magnetic sensor engages and thereafter prevents any rotation of the movable cam. The latter engagement results when the caster passes through a magnetic field created by a magnet imbedded in a surface on which the assembly is traveling.

The preceding is effectively brought about through structure having a minimum number of components, which is readily assembled during manufacturing, and which is adaptable to its use on the aforedescribed movable type cart or, for that matter, in any instance where it is desired to have positive locking of a wheel against rotational displacement.

Accordingly, the principal object of the present invention is to provide a new and novel wheel locking arrangement for a caster assembly.

Another object of the present invention is to provide a new and novel caster assembly which locks against further rotation when moved through a magnetic field.

Still another and a more general object of the present invention is to provide an anti-rotation device for a wheel which operates by reason of the outward thrust of a movable cam against part of the supporting framework for the wheel.

Other objects and a better understanding of the present invention will become more apparent from the following description, taken in conjunction with the accompanying drawings, wherein:

FIG. 1 is a view in side elevation, partly broken away, showing the applicants' new and novel caster assembly;

FIG. 2 is a view in vertical section, taken at line 2—2 of FIG. 3 and locking in the direction of the arrows, showing details of a typical caster assembly made in accordance with the invention;

FIG. 3 is a view mostly in horizontal section, showing still further details of the caster assembly of FIGS. 1 and 2, but without any showing of the supporting framework;

Figure 6:
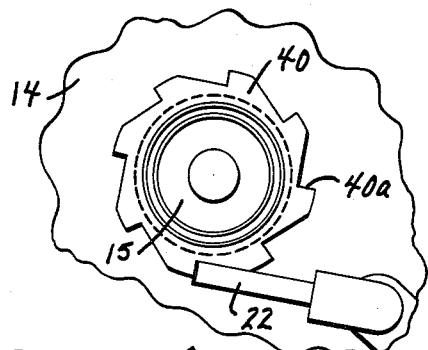
FIG. 6 is a fragmentary view of an alternate wheel locking arrangement in accordance with the instant invention; and, FIG. 7 is a view mostly in horizontal section, showing details of the alternate wheel locking arrangement of FIG. 6.
Figure 4:
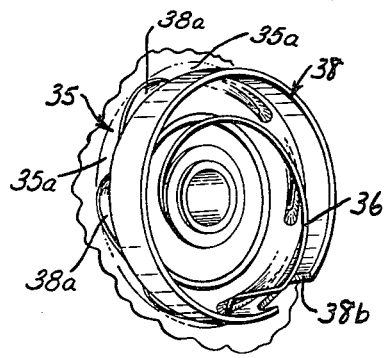
FIG. 4 is a perspective view showing the normal position of the inner and outer cams forming part of the instant invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1 to 5, the applicants' new and novel caster assembly typically comprises supporting framework (not fully shown) having depending arms 11 between which a bolt 12, serving as an axle for a wheel 14, extends. In a preferred form of the invention, the wheel 14 is typically a hard core, soft tire wheel, of a type commonly known in the trade. Wheel 14 has an axial opening 14a therein which is adapted to receive bearings 15 through which the aforesaid bolt 12 extends. A threadguard or side plate 18 is disposed on one side of the wheel 14, mostly for decorative purposes, while another threadguard or side plate 20, to be discussed more fully herebelow, is disposed on the opposite side of the wheel 14.

As should be apparent from the drawings, the threadguard 20 has a series of webs 20a extending from the inner surface thereof. Also disposed on the aforesaid inner surface of the threadguard 20 is a magnetic sensor member 22 which is pivotal on a pin 22a between a normal non-locking position (FIG. 1) to a locking position (FIG. 2) when the caster assembly moves through a magnetic field, where such magnetic sensor member 22 has ends 22b and 22c which are of opposite polarity. In this latter regard, the aforesaid magnetic field is created by a permanent type magnet 30 imbedded in a surface on which the caster assembly is caused to roll, whereupon as the top end of the permanent type magnet 30 and the "locking" end 22b of the sensor member 22 have the same polarity, a repelling action causes the rotation of the sensor member 22 from the position of FIG. 1 to that of FIG. 2.

In order to position the sensor member 22 during normal movement of the caster assembly, another permanent type magnet 24 is disposed on the inner surface of the thread guard 20. Actually, magnet 24 creates a magnetic field having the same polarity to that of the "non-locking" end 22c of the sensor member 22, whereby the sensor member 22 is normally maintained in a non-locking position and, hence, false locking is prevented during normal rotation of wheel 14. Moreover, it should be understood that in order to effect locking, the imbedded permanent type magnet 30 creates a large repelling force which overcomes any magnetic field created by the magnet 24, and, hence, permits the rotation of the sensor member 22, to be discussed herebelow.

The caster assembly is completed through the use of an inner cam 35 which is fixedly secured to the hub of the wheel 14 and which has a series of spaced-apart protrusions 35a on its face. An outer cam 38 is normally in engagement with the face of the aforesaid inner cam 35 and is resiliently secured thereto by means of a spring member 36 which exerts a force on the outer cam 38 in the direction of the inner cam 35. It should be understood that the supporting end of the spring member 36 is wedged behind a portion of one of the bearings 15. The outer cam 38 also has the aforedescribed series of spaced-apart protrusions 38a on a face thereof so that during normal rolling of the wheel 14 forming part of the instant caster assembly, the protrusions on the faces of the inner and outer cams 35 and 38, respectively, are in complementary relationship, the latter being evident from FIG. 4.

In use, when the sensor member 22 is caused to pivot on pin 22a because of the passage of the caster assembly through a magnetic field created by permanent type magnet 30, i.e. when the assembly travels in the direction of the arrows of FIGS. 1 and 2, end 22b thereof rides along the rim of the outer cam 38, ultimately engaging a cutout portion 38b thereof. The outer cam 38 is then prevented from rotating with the inner cam 35, and, as a consequence, the inner and outer cams 35 and 38, respectively, assume the position shown by FIG. 5, i.e. the outer cam 38 moves axially (in the direction of the arrow) away from the inner cam 35 into engagement with the inner surface of the threadguard 20. In other words, the spaced-apart protrusions 38a on the face of the outer cam 38 ride up on the spaced-apart protrusions 35a on the face of the inner cam 35, and when so riding, ultimately engages the inner face of the threadguard 20, creating a frictional force or thrust which positively stops the wheel 14 of the caster assembly from rotating.

When it is desired to unlock the wheel 14, the latter is rotated in an opposite direction from its prior travel and a portable magnet is used to attract the sensor member 22 from its locking position of FIG. 2 to its normal non-locking position of FIG. 1.

Figure 7:
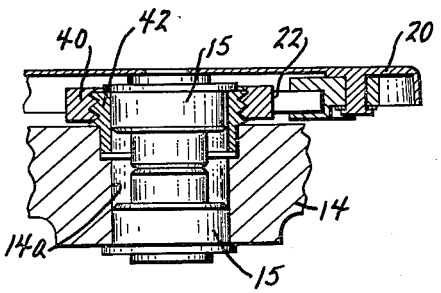
Figure 5:
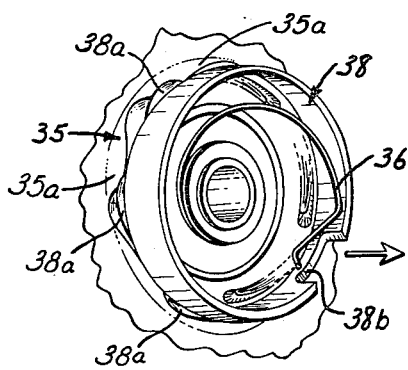
FIG. 5 is another perspective view, comparable to the view of FIG. 4, but showing the relation of the inner and outer cams when locking is effected.

With reference now to FIGS. 6 and 7, where like reference numerals are used to designate like parts of FIGS. 1 to 5, an alternate wheel locking arrangement is disclosed having an operation which, in principle, is similar to that described hereabove. In this instance, however, instead of employing inner and outer cams 35 and 38, respectively, locking is effected through the sensor member 22 engaging a stop 40, i.e. one of the slots 40a along the outer surface of the latter, where the stop 40, which is threadedly positioned on a member 42 movable with the wheel 14, moves in an outward direction and creates a frictional force against the threadguard or side plate 20 of the caster assembly, and, hence, provides the desired locking action.

From the proceding, it should be apparent that the applicants have provided a new and novel caster assembly which simply, yet effectively, locks a wheel against rotation upon passage through a magnetic field. It should be readily understood from the above that by imbedding permanent type magnets around the periphery of a desired area, the movement of the aforedescribed supermarket carts can, therefore, be limited to such defined space.

It should be obvious, of course, that the locking arrangement described hereabove is susceptible to various changes within the spirit of the invention. For example, the illustrated device may be varied dimension-wide to facilitate use under other operating conditions. Thus, the preceding description should be considered illustrative and not as limiting the scope of the following claims.

We claim:

1. A caster assembly comprising a wheel, a supporting framework for said wheel, a first member positioned on said wheel and rotatable therewith, a wedging member mounted for axial movement relative to said first member and engaging said first member and movable thereon from a first position to a wedging position with said supporting framework, magnetic means pivotally disposed on said supporting framework to engage means on said wedging member to stop rotation thereof, and other magnetic means stationary and independent of said supporting framework selectively moving said magnetic means into engagement with said wedging member to effect wedging between said supporting framework and said wedging member when both of said magnetic means are brought into proximity with each other.

2. A caster assembly comprising a wheel, a supporting framework for said wheel, a first member positioned on said wheel and rotatable therewith, a stop member threadedly secured to said first member and mounted for axial movement relative thereto towards said framework, magnetic means pivotally disposed on said supporting framework to engage means on said stop member to stop rotation thereof, and other magnetic means stationary and independent of said supporting framework selectively moving said magnetic means into engagement with said stop member to effect wedging between said stop member and said supporting framework when both of said magnetic means are brought into proximity with each other.

3. A caster assembly comprising a wheel, a supporting framework for said wheel, a first cam positioned on said wheel and rotatable therewith, a second cam engaging said first cam and rotatable therewith, means continually urging said second cam into said engagement with said first cam, co-operating means on said first and said second cams permitting selective movement of said second cam in a direction away from said first cam toward said framework, magnetic means pivotally disposed on said supporting framework, means on said second cam co-operable with said magnetic means for locking said second cam against rotation, and other magnetic means stationary and independent of said supporting framework moving said magnetic means into locking engagement with said means on said second cam to effect movement of said second cam into a wedging position between said first cam and said supporting framework when both of said magnetic means are brought into proximity with each other.

4. A caster assembly comprising a wheel, a supporting framework for said wheel, a first cam positioned on said wheel, a second cam engaging said first cam and rotatable therewith, means continually urging said second cam into said engagement with said first cam, said first cam being rotatable with said wheel, co-operating means on said first and said second cams permitting selective movement of said second cam outwardly from said wheel into engagement with said supporting framework, means on said second cam co-operable with said magnetic means for locking said second cam against rotation, and other magnetic means stationary and independent of said supporting framework moving said magnetic means into locking engagement with said means on said second cam when both of said magnetic means are brought into proximity with each other whereby said first cam serves to move said second cam into a wedging position with said supporting framework.

5. A caster assembly comprising a wheel, a supporting framework for said wheel, a first cam secured to said wheel, a second cam engaging said first cam and rotatable therewith, spring means continually urging said second cam into said engagement with said first cam, co-operating means on said first and said second cams whereby said second cam selectively moves outwardly from said first cam towards a portion of said supporting framework, magnetic means pivotally disposed on said supporting framework, means on said second cam co-operable with said magnetic means for locking said second cam against rotation, and other magnetic means stationary and independent of said supporting framework moving said magnetic means into engagement with said means on said second cam to move said second cam into a locking position with said supporting framework when both of said magnetic means are brought into proximity with each other.

6. The caster assembly of claim 5 where another magnetic means disposed on said supporting framework urges said magnetic means into a normal non-engaging relationship with said means on said second cam.

7. A caster assembly comprising a wheel, a supporting framework for said wheel, a first cam positioned on said wheel and rotatable therewith, a second cam engaging said first cam and rotatable therewith, means continually urging said second cam into said engagement with said first cam, said first cam having portions thereof on which said second cam is adapted to ride whereby said second cam can selectively move outwardly from said first cam toward locking engagement with said supporting framework, magnetic means pivotally disposed on said supporting framework, means for said second cam co-operable with said magnetic means for locking said second cam against rotation, and other magnetic means stationary and independent of said supporting framework effect movement of said magnetic means into locking engagement with said means on said second cam and causing said second cam to ride on said portions of said first cam to effect said outward movement of said second cam and locking engagement between said second cam and said supporting framework when both of said magnetic means are brought into proximity with each other.

8. A caster assembly comprising a wheel, a supporting framework for said wheel, a first cam secured to said wheel, a second cam engaging said first cam and rotatable therewith, spring means continually urging said second cam into said engagement with said first cam, said first cam having portions thereof on which said second cam selectively rides to permit movement of said second cam outwardly toward and into wedging engagement with said supporting framework with respect to said first cam, magnetic means pivotally disposed on said supporting framework, means on said second cam co-operable with said magnetic means for locking said second cam against rotation, and other magnetic means stationary and independent of said supporting framework moving said magnetic means into locking engagement with said means on said second cam independent of rotation of said first cam, the rotation of said first cam serving to move said second cam into wedging engagement with said supporting framework when both of said magnetic means are brought into proximity with each other.

References Cited in the file of this patent
UNITED STATES PATENTS
2,964,140    Berezny _____ Dec. 13, 1960